(12) United States Patent
Brauers et al.

(10) Patent No.: US 8,535,794 B2
(45) Date of Patent: Sep. 17, 2013

(54) DEVICE, ESPECIALLY SPORTING EQUIPMENT FOR USE IN SURFING OR SIMILAR ACTIVITIES, AND A METHOD FOR PRODUCING FIBER COMPOSITES

(76) Inventors: Sven Brauers, Hannover (DE); Rouven Brauers, The Hague (NL)

( * ) Notice: Subject to any disclaimer, the term of this patent is extended or adjusted under 35 U.S.C. 154(b) by 769 days.

(21) Appl. No.: 11/341,913

(22) Filed: Jan. 30, 2006

(65) Prior Publication Data

US 2006/0189239 A1 Aug. 24, 2006

Related U.S. Application Data

(63) Continuation of application No. PCT/EP2004/008545, filed on Jul. 29, 2004.

(30) Foreign Application Priority Data

Jul. 30, 2003 (DE) .................................. 103 35 198

(51) Int. Cl.
*B32B 3/06* (2006.01)

(52) U.S. Cl.
USPC .............. 428/306.6; 428/304.4; 428/30.8; 428/314.4; 428/317.9; 428/318.4; 428/319.3; 428/71; 428/141; 428/173; 428/600; 428/156; 442/9; 442/22; 442/30; 442/55; 442/56; 442/221; 442/315; 442/370; 441/74

(58) Field of Classification Search
None
See application file for complete search history.

(56) References Cited

U.S. PATENT DOCUMENTS

| 4,042,746 A | * | 8/1977 | Hofer ........................ 428/308.4 |
| 4,188,428 A | | 2/1980 | Wolf |
| 4,428,998 A | | 1/1984 | Hawkinson |
| 4,753,836 A | | 6/1988 | Mizell |
| 5,275,860 A | | 1/1994 | D'Luzansky et al. |
| 5,292,833 A | * | 3/1994 | Grahe et al. .................. 525/531 |
| 6,106,345 A | | 8/2000 | Yeh |

FOREIGN PATENT DOCUMENTS

| AT | 403 251 B | 5/1997 |
| AT | 406 341 B | 4/2000 |
| DE | 27 36 842 A1 | 3/1979 |
| DE | 28 29 380 A1 | 1/1980 |
| DE | 33 15 776 A1 | 1/1985 |
| DE | 33 40 633 A1 | 5/1985 |
| DE | 34 17 217 A1 | 1/1986 |
| DE | 35 30 537 A1 | 3/1987 |
| DE | 35 37 703 C1 | 5/1987 |
| DE | 39 40 707 A1 | 6/1990 |

(Continued)

OTHER PUBLICATIONS

International Search Report dated Dec. 3, 2004, in PCT/EP2004/008545, filed Jul. 29, 2004 (4 pages).

(Continued)

*Primary Examiner* — Gerard Higgins
*Assistant Examiner* — Anish Desai
(74) *Attorney, Agent, or Firm* — Shlesinger, Arkwright & Garvey LLP.

(57) ABSTRACT

Device, especially a piece of sporting equipment for use in surfing or similar activities, includes a base made of foamed plastic, which has at least one laminate coating made of a fabric laminate and an underlay compound. The device includes an intermediate layer between the base and the laminate coating. Likewise provided are a number of processes for producing fiber composites in connection with foamed plastics.

23 Claims, 4 Drawing Sheets

(56) References Cited

FOREIGN PATENT DOCUMENTS

| | | |
|---|---|---|
| DE | 41 06 888 A1 | 9/1991 |
| DE | 41 28 957 A1 | 3/1993 |
| DE | 42 13 656 C2 | 3/1994 |
| DE | 38 27 433 C2 | 4/1994 |
| DE | 44 14 150 | 10/1995 |
| DE | 197 41 917 A1 | 3/1999 |
| DE | 100 40 780 A1 | 3/2002 |
| DE | 603 17 340 T2 | 8/2008 |
| EP | 0 069 076 A1 | 1/1983 |
| EP | 0 264 495 | 4/1988 |
| EP | 03177474 | 8/1991 |
| EP | 0 846 479 A2 | 6/1998 |
| EP | 1 457 312 A1 | 9/2004 |
| FR | 2 534 188 A1 | 4/1984 |
| WO | WO 2005/012074 A1 | 2/2005 |
| WO | WO2005/012074 A1 * | 2/2005 |
| WO | 2005/012074 A1 | 3/2005 |
| WO | WO 2007/069746 A1 | 6/2007 |

OTHER PUBLICATIONS

German Office Action, dated Feb. 2, 2004, in German application No. 103 35 198.1, filed Jul. 30, 2003 (3 pgs.).

German Office Action, dated Oct. 1, 2007, in German application No. 103 35 198.1, filed Jul. 30, 2003 (3 pgs.).

* cited by examiner

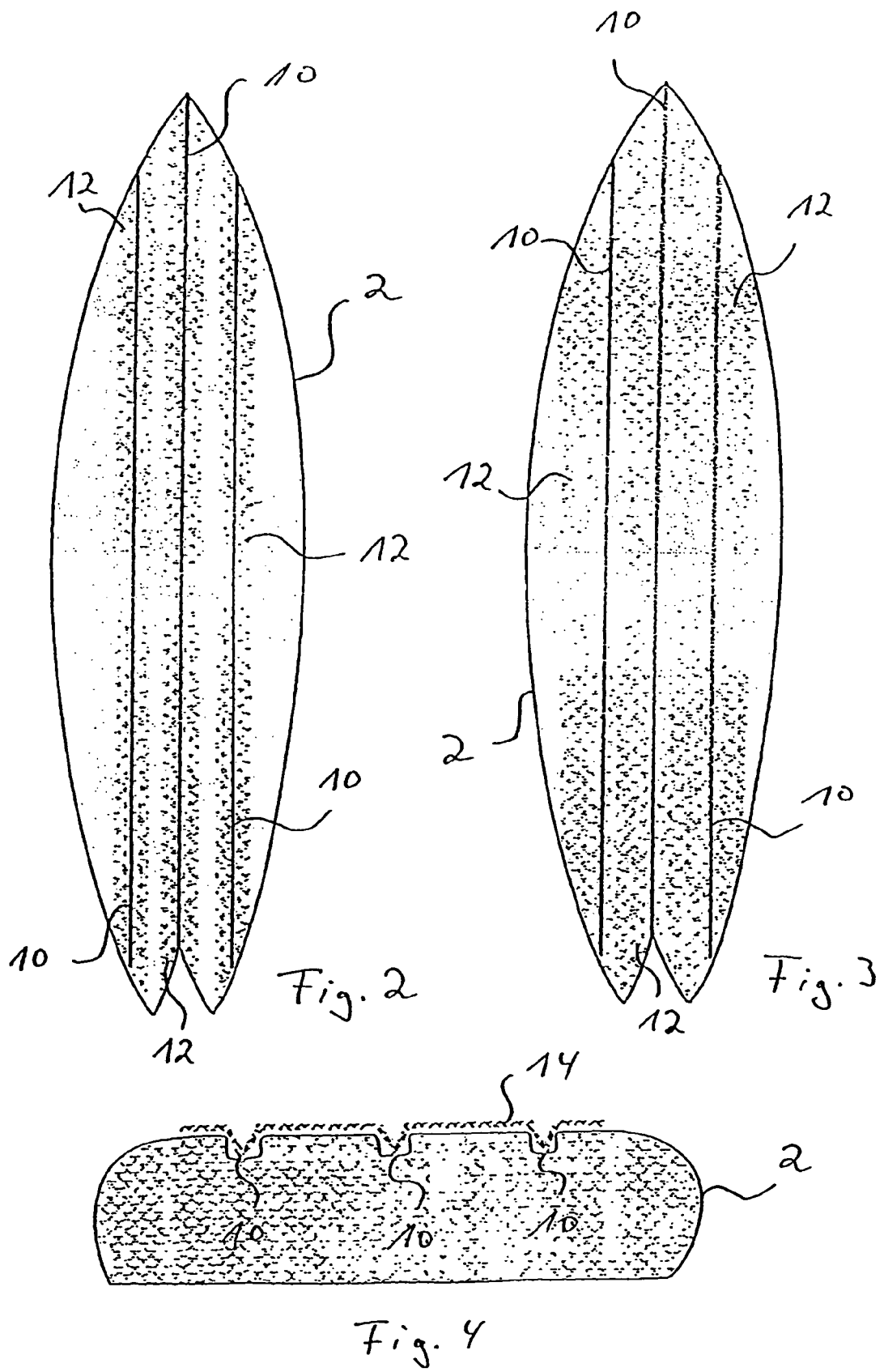

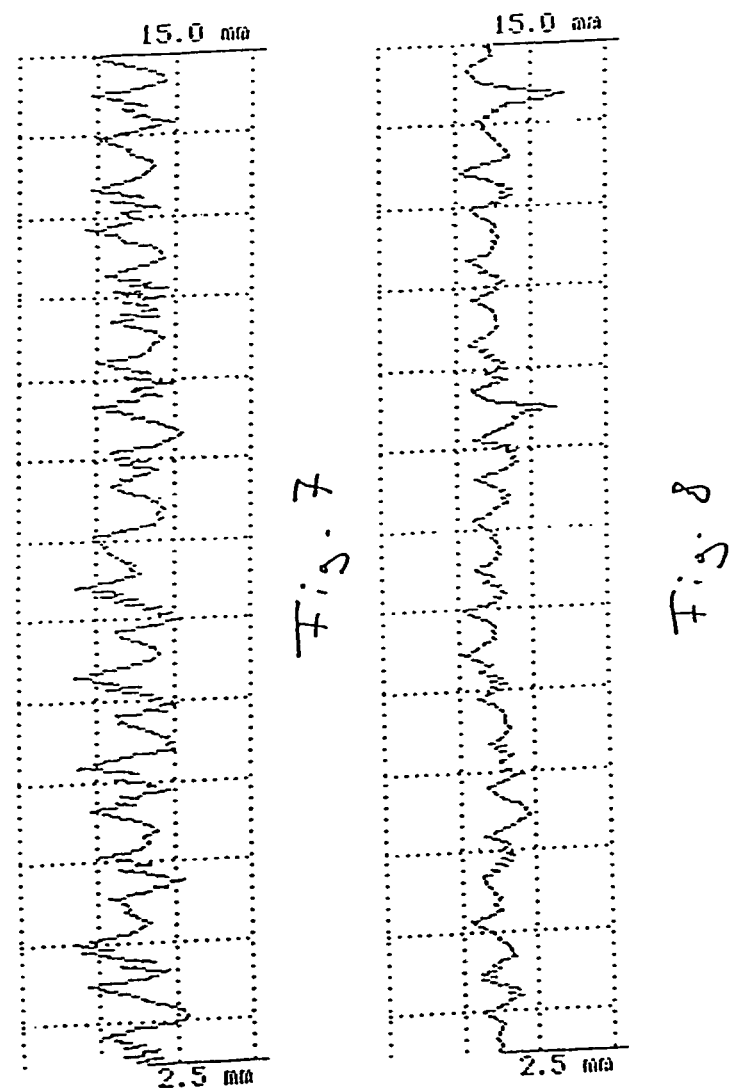

DEVICE, ESPECIALLY SPORTING EQUIPMENT FOR USE IN SURFING OR SIMILAR ACTIVITIES, AND A METHOD FOR PRODUCING FIBER COMPOSITES

CROSS-REFERENCE TO RELATED APPLICATIONS

This application is a continuation of International application no. PCT/EP2004/008545, filed 29 Jul. 2004, which claims priority of German application no. 103 35 198.1, filed 30 Jul. 2003, and each of which is incorporated herein by reference.

FIELD OF THE INVENTION

The invention relates to a device, especially sporting equipment for use in surfing or similar activities, and a method for producing fiber composites.

BACKGROUND OF THE INVENTION

Known equipment used in surfing, such as surfboards, skateboards, skimboards, wakeboards, kneeboards or kiteboards can comprise a base made of foamed materiel, which in a first processing step is formed into a desired board-like shape having an upper and a lower side, and in a second processing step is provided with laminate coatings. In this, the laminate coatings are applied in two successive processing steps, since the upper and lower sides of the board-shaped base must be laminated separately from one another in order to produce a complete laminate covering over the entire surface of the base. However, the laminate coating may also be applied in a single strengthening pass.

During use, a surfboard, for example, is subjected to substantial levels of stress, which can lead to a deformation of the surfboard of up to 30 cm. This is combined with the problem that the laminate covering will separate from the foamed plastic base in areas where axial compression occurs as a result of the mechanical stress on the surfboard. This process of separation of the laminate covering progresses with the continued use of the surfboard, until the surfboard can no longer be used properly and eventually breaks.

OBJECTS AND SUMMARY OF THE INVENTION

An object of the invention is overcome the drawbacks of the prior art.

Another object of the invention is to provide a device, especially sporting equipment for use in surfing and similar activities, and to disclose a method for producing fiber composites, with which, despite high mechanical stress levels, the laminate covering will not become separated from the foamed material base, and the breaking strength is increased.

The object of the invention is achieved with a device including a base made of foamed plastic, which includes at least one laminate coating comprised of a fabric laminate and an underlay compound.

The invention solution further includes that an intermediate layer is provided between the base and the at least one laminate coating. With an intermediate layer of this type, the attachment between the base and a laminate covering comprised of two laminate coatings can be substantially improved even under extreme levels of mechanical stress. Furthermore, in this manner an optimal combination of lightness, flexibility and stability can be achieved.

It is preferably provided that the intermediate layer comprises material of the base and of the underlay compound. Combining these two materials in the intermediate layer gives the intermediate layer mechanical properties that reduce mechanical tensions that occur on a boundary layer between two different materials under mechanical stress.

In a further embodiment it is provided that the intermediate layer comprises material from the fabric laminate. In this, fabric laminate sections can be pressed into the base, or the base is coated with the fabric laminate, after which the fabric laminate is pressed at points into the base (stitched). To accomplish this, devices such as a reciprocating saw with a blunt tip, or a blunt needle roller can be used. A device of this type can also withstand extreme stresses.

In one preferred embodiment it is provided that the intermediate layer comprises a foamed plastic layer that is equipped with indentations. In the indentations in the foamed plastic layer, which has been applied to the base, the underlay compound is allowed to penetrate, thereby effecting an improved attachment between the surface of the foamed plastic base and the laminate covering as a result of the enlarged surface and the improved contact of the roughened surface.

It is preferably provided that the indentations are designed as grooves, so that along the linear grooves a particularly strong connection between the foamed plastic base and the laminate covering is created.

In one preferred embodiment it is provided that fabric laminate is arranged, at least in sections, in the grooves, at least in sections. In this manner a significant increase in strength can be achieved in that, for example, multiple, preferably 1 to 20, grooves extending longitudinally are cut into the base, after which the fabric laminate is pressed into the grooves, for example using a suitable tool. The grooves may be filled with underlay compound prior to this pressing step. The fabric laminate can be applied in the form of fabric laminate strips, for example having a width of 15 to 35 cm. However, fabric laminate strips of narrower or greater width, or a full-surface fabric laminate layer may also be used. The laminate coating is then completed with the application of an underlay compound. In this manner the fiber ratio can be increased to up to 80%, which further increases stability and strength.

In this case, the grooves have a depth of up to 4 cm, in order to produce a connection between the foamed plastic base and the laminate covering that can withstand even extreme mechanical stresses.

In this case, the grooves extend parallel and/or criss-crossing over the surface of the base, in order to achieve a non-directional improvement of the connection.

In a further embodiment it is provided that the indentations are configured as sinkholes. The sinkhole-like indentations can be conical or cylindrical in shape, with depths of up to 3 cm and a diameter of up to 5 mm. However the indentations may also connect the upper and underneath sides of the board-shaped base via the formation of passageways, so that the two laminate coatings are connected directly to one another via underlay compound in the passageways. Preferably, however, the indentations have a depth of 1 to 2 cm and a diameter of 1 to 3 mm, wherein the indentations are preferably arranged in a regular pattern. Thus the base has a regular pattern with indentations in which the underlay compound can penetrate thereby improving the attachment between the foamed plastic base and the laminate covering. However, the base may also be provided with an irregular pattern.

Preferably, the fabric laminate is comprised of glass fibers, aramid, polyethylene fibers, carbon fibers, glass filament fabric, carbon fabric, fiberglass fabric, hemp fiber fabric, Dyneema, bamboo fabric, Texalium, Parabeam, fiberglass layers/fabric, woven glass roving fabric or a combination of the above-listed materials.

In this, in one preferred embodiment, the fabric surface weight in the case of glass fibers is 80 g/m$^2$ to 480 g/m$^2$ and in the case of aramid is 60 g/m$^2$ to 400 g/m$^2$. If particularly high levels of stress are anticipated, the fabric surface weight for glass fibers or aramid can be up to 1,000 g/m$^2$.

Preferably, the fabric laminate comprises at least one type of weave from the group of linen, twill 1/3, twill 2/2, unidirectional, glass staple fiber fabric, woven glass roving fabric, carbon layers, biaxial layers, PE fibers, combined fibers or Parabeam. In this, Parabeam is a spacer fabric.

Known foamed plastic materials or foamed plastics can be used, but preferably foamed plastics made of polyurethane or polystyrene, which are easy and cost-effective to process. Further, PVC, core-cell SAN (styrene-acrylic-nitride), polymer foam SP 110, and phenolic foam may also be used. In this, the foamed plastic preferably has a closed cell structure. However a foamed plastic having an open cell structure may also be used.

Preferably, unsaturated polyester resin (UP), epoxy resin (EP), vinyl ester resin (VE) or polyurethane resin (PU) is used as the underlay compound. With these materials, together with the above-listed fabric laminates, foamed plastics such as polyurethane or polystyrene can be coated or encased without problems.

In one particular embodiment, filler material is added to the underlay compound. This material may comprise hollow glass bead, talcum, wood flour, glass fiber chips, cotton flock, aluminum powder, ground carbon fibers, chalk, ground quartz, ground hemp fibers, silicic acids or dyes, or a combination of these. With these filler materials, the adhesion and workability of the underlay compound can be positively influenced, and its mechanical properties can be adjusted to those of the foamed plastic base, thus preventing a separation of the laminate coating or covering from the base.

The process of the invention for producing a fiber composite, especially for sporting equipment for use in surfing or similar activities, is based upon a process comprising the steps:

1. forming a base from foamed plastic to a desired shape,
2. at least partially coating the base in a lamination process.

Attainment of the object of the invention includes that prior to the second step, at least one portion of the surface of the base to be coated is provided with indentations or elevated areas. In this, the process of the invention is based upon the surprising discovery that an improvement in the connection between the base and a laminate coating can be achieved by providing the surface of the base with indentations or elevated areas before it is coated with laminate, wherein the underlay compound is allowed to penetrate into the spaces between indentations or elevated areas, and is then used in the lamination process.

In one preferred embodiment it is provided that prior to the second step fabric particles are applied at least in a portion of the indentations. These fabric particles can be sections of fabric laminate that are of the correct size, or sections of the fabric laminate that are applied flat to the base and are pressed (stitched) into the base at selected points. In this manner an increase in the fiber volume in the intermediate layer can be achieved, which leads to an increase in the mechanical stress-ability.

In a further embodiment it is provided that the indentations are filled at least partially with an underlay compound before the fabric particles are applied. In this manner a particularly strong fiber composite, especially for sporting equipment for use in surfing, can be obtained.

Preferably, the indentations are comprised of grooves and/or sinkholes, so that the underlay compound can penetrate along the linear grooves and in the sinkholes arranged over the surface, effecting an improvement of the connection between the base and the laminate coating.

The indentations can be produced via milling, for example using a CNC machine, boring, stamping, cutting, compressing, or other processes. For example, multiple, for example 1 to 20, grooves extending longitudinally along the base can be created in the base via milling. In this, the dimensions of the applied grooves are such that the fabric laminate can be pressed into the grooves at least in sections, for example using a suitable tool, before the laminate coating is completed via the application of an underlay compound. Prior to the pressing-in process, the grooves can be filled with underlay compound. Alternatively, the grooves may also be filled in later. With the pressing-in of fabric particles, a fiber ratio of up to 80% can be achieved, which serves to increase strength and stability. It is further provided that the grooves and/or sinkholes are produced by pressing in the surface of the base. In this manner, no manufacturing processes involving the removal of material are necessary, which present a health hazard due to the dust they create.

It is preferably provided that in a first step the grooves are produced, and in a second step sinkholes are created in the surface of the base. In this, the grooves are preferably generated using a milling cutter, while the sinkholes are generated using a needle roller. In this manner the sinkholes, which are designed to be deeper and larger, do not prevent the creation of grooves on the surface of the base using a cutting comb.

In one preferred embodiment it is provided that, following the application of indentations in the surface of the base, the base is coated with the underlay compound. With this coating process, the underlay compound is allowed to penetrate into the grooves and/or sinkholes that have been created beforehand in the surface of the base, while at the same time improving the attachment to the fabric laminate to be applied.

Different underlay compounds may be used for coating and for laminating. However it is preferably provided that the same underlay compound is used, so that the connection between the underlay compound applied in the grooves and/or sinkholes and the underlay compound used for lamination is optimized.

In one preferred embodiment, the lamination is performed by hand, using a vacuum press, the autoclave process, or the injection process.

In the case of lamination by hand, the fabric laminate is placed over the filled base. Underlay compound is then poured over the fabric laminate and impregnates the fabric laminate lying on the base. The tools used for this are primarily brushes and grooved rollers/flocking rollers. A tear-off fabric is then applied. The tear-off fabric, which is comprised, for example, of nylon fibers, can be shaved off or torn off once the underlay compound has hardened, thus creating a definitively rough, clean, and non-adhesive surface, which can be further processed. The hardening of the laminates takes place without pressure at room temperature. Hot and cold hardening underlay compounds exist, which harden at temperatures of 10 to 230° C. Afterward, further processing can take place.

In the case of vacuum pressing, the previously hand-laminated base is placed in a foil sack that can be evacuated. Once the air has been drawn out, the foil becomes pressed onto the laminate and pressed onto the form. The maximum pressure is determined by the surrounding atmospheric pressure, and amounts to ca. max. 1 bar. With the vacuum pressing process, the fiber ratio for the laminate can be increased, or excess underlay compound can be forced out. In addition, lightweight core materials such as foamed plastics or netting with high-strength coating layers of resin or fabrics can be glued to one another, thus forming an extremely lightweight and strong component. An even level of contact pressure is required for this. To accomplish this, the laminate is first covered with a tear-off fabric and a non-adhering punched foil. An air-permeable vacuum web is placed over this, the task of which is to distribute the vacuum pressure evenly and suction excess underlay compound out of the laminate. The subsequent hardening can take place at room temperature, however a tempering is also possible.

In the case of the autoclave process, a tear-off fabric, a punched foil, a vacuum web and a vacuum foil are also used. A vacuum is then created. The hardening of the underlay compound can take place under a pressure of 6 bar and at temperatures of 170° C., or at room temperature.

A further process is the injection process, in which dry fabric laminate is placed on the base. This is followed by a tear-off fabric, a punched foil, a vacuum web and a vacuum foil. The impregnation of the fabric laminate with the underlay compound takes place first, after a vacuum has been created.

Another device for use in surfing and similar activities, especially surfboards, skateboards, skimboards, wakeboards, kneeboards and kiteboards, is based upon a device including a base made of foamed plastic, which has at least one laminate coating including a fabric laminate and a underlay compound.

This device according to the invention is characterized in that it has a surface that comprises roughness elements at least in sections. With this type of structuring of the surface, the water resistance can be substantially reduced, so that much higher speeds can be achieved.

A further advantage is that, due to the rough surface, it is no longer necessary to coat at least the upper side of a board of this type with wax, which serves to ensure a more secure stance on the board (and increases the skid-resistance of the board). With this, the labor-intensive process of coating the board with wax is eliminated; this process also involves the removal of the wax after use of the board, which is also highly labor-intensive. It is also problematic that the wax softens under solar radiation and adheres to objects that come into contact with it, thus creating dirty areas, for example inside an automobile.

It is preferably provided that the indentations are designed to be point symmetric, and are arranged non-directionally. The surface structure thereby serves to achieve not only a speed increase in one direction, but also a reduction in water resistance in all directions, in other words even with backward or lateral movements. Thus the structure of the invention is particularly well suited for surfboards, wakeboards or kiteboards.

In one preferred embodiment, the maximum surface roughness of the indentations is up to 1,000 µm, preferably between 60 and 150 µm. In this, the maximum surface roughness is defined as the vertical distance between the highest and lowest points in a (filtered) roughness profile within a measuring length according to DIN 4762.

Preferably, the mean roughness value lies between 5 and 100 µm, preferably between 10 and 15 µm. In this, the mean roughness value is defined as the arithmetic mean of the profile deviations of the (filtered) roughness profile of the center line within the measuring length, according to DIN 4786, DIN 4762 and ISO 4287/1.

The process for producing a fiber composite, especially for sporting equipment for use in surfing or similar activities, is based upon a process comprising the steps
1. shaping a base from foamed plastic,
2. coating at least one surface of the base by means of lamination.

The process of the invention is characterized in that the surface of the laminated base is equipped at least in sections with roughness elements. In this, the roughness elements have a maximum surface roughness of up to 200 µm, preferably between 60 and 150 µm, wherein the mean roughness value lies between 5 and 50 µm, preferably between 10 and 15 µm, as experimental tests have shown that at these values a significant reduction in water resistance is achieved while at the same time adequate skid resistance on the surface is provided, which makes it possible to eliminate the use of a wax coating.

These roughness elements can be created through a process of pushing or pressing, or in a cutting process. However it is preferably provided that during the lamination, a tear-off fabric is applied to the base, which upon completion of the lamination is again removed. The use of a tear-off fabric in the case of lamination by hand, using a vacuum press in an autoclave process, and in the vacuum injection process is known. In these processes, the tear-off fabric is placed on the laminate before the underlay compound hardens.

In one preferred embodiment it is provided that the surface that is equipped with roughness elements is coated with a compound. This compound having a suitably low viscosity penetrates into the indentations and collects at the base of the indentations, so that the indentations become partially filled, and in this manner, by filling in the deepest indentations, the roughness profile is homogenized.

In this it is provided that the low-viscosity compound contains polyester resin, Teflon, epoxy resin, acrylic lacquer or lotus lacquer.

The tear-off fabric is preferably comprised of nylon fibers and can be shaved or torn off after hardening of the underlay compound. The tear-off fabric can also be comprised of other materials that do not absorb the underlay compound and thus do not form an attachment to the hardened underlay compound. Once the tear-off fabric has been torn off, a rough, clean and non-adhesive surface remains, which can be further processed. In this, it has been surprisingly found that the surface structure that is created following the removal of the tear-off fabric is equipped with non-directional roughness elements, which lead to a significant reduction in water resistance.

The tear-off fabric preferably has a linen or twill weave type, which possess a regular structure.

In one particular embodiment the tear-off fabric has a surface weight of between 50 and 120 $\mu m^2$, preferably between 90 and 110 $g/m^2$.

Relative terms such as left, right, up, and down are for convenience only and are not intended to be limiting.

Below, the invention will be described in greater detail with reference to a drawing.

BRIEF DESCRIPTION OF THE DRAWINGS

FIG. 2 shows a plan view of a first embodiment of a device according to the invention;

FIG. 3 shows a plan view of a further embodiment of a device according to the invention;

FIG. 4 shows a cross-section through a device according to the invention; and

FIG. 5-8 show surface profiles of a surfboard according to the invention.

DETAILED DESCRIPTION OF THE INVENTION

Figure 1:
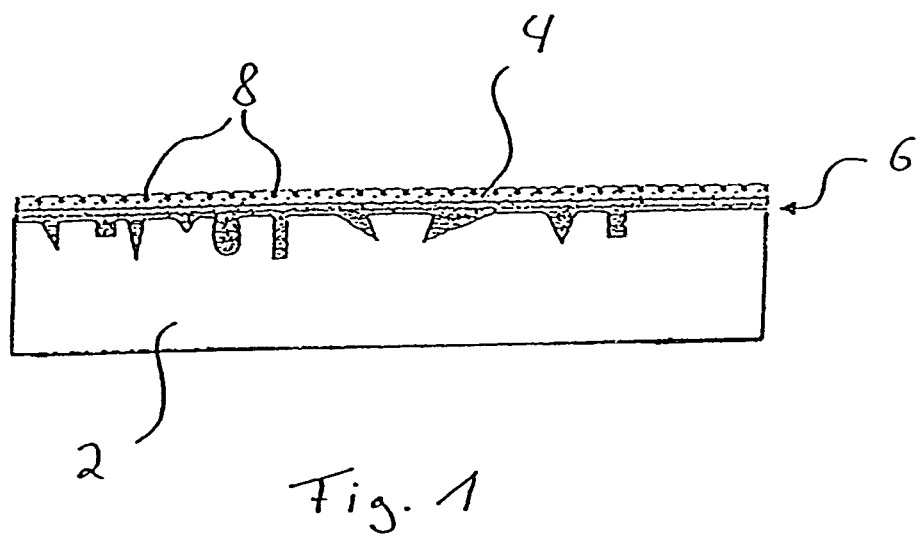
FIG. 1 shows a schematic cross-section through a device according to the invention.
Figure 5:
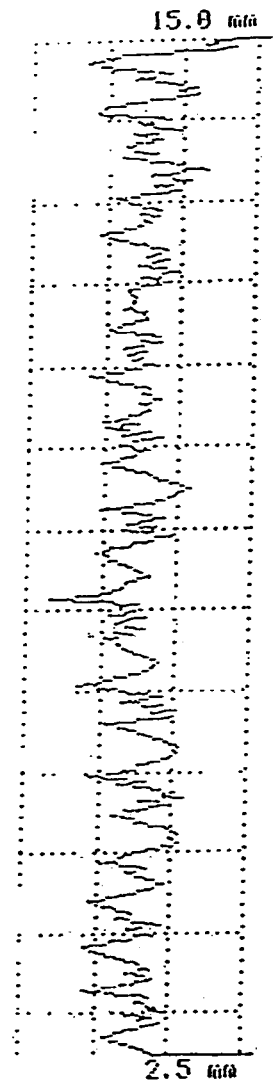
Figure 6:
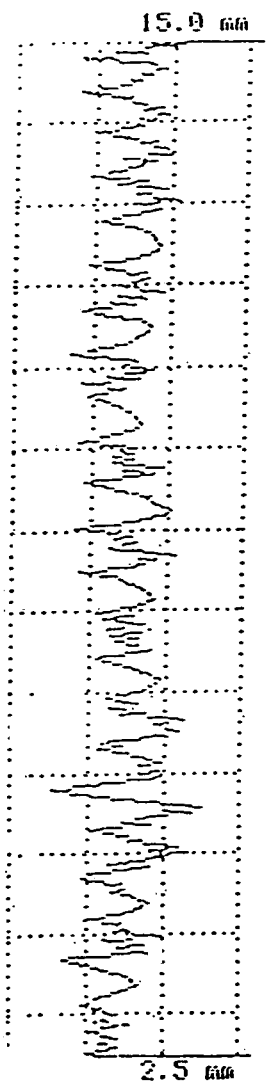

Below, reference is made to FIG. 1.

The device includes a base 2 made of polyurethane or polystyrene or some other foamed plastic, the upper side of which is provided with a laminate coating 4 made of a fabric laminate and a underlay compound. Between the base 2 and the laminate coating 4 is an intermediate layer 6, which is comprised of a surface section of the base 2 that has been equipped with multiple variously shaped indentations, into which underlay compound has penetrated, with which the fabric laminate has also been impregnated.

On the upper side of the laminate coating, a number of roughness elements 8 are arranged, the purpose of which is to reduce water resistance.

Below, the process for producing the device will be described.

The base 2 is formed in the desired shape, for example a surfboard, using cutting machines, planes, saws and sandpaper or using a CNC machine.

In a further step, grooves are pressed into the surface of the base using a milling cutter. The entire surface of the base 2 is then equipped with sinkholes using a coarse needle roller. This process step involving the needle roller is then repeated using smaller needles. In this process, the needle roller is rolled in different directions, and these process steps are repeated until an even structure is produced on the surface. With the combination of creating sinkholes with the needle roller and creating grooves using a milling cutter, a particularly strong adhesion of the laminate coating 4 on the base 2 can be achieved.

In areas of high mechanical stress, the surface can be covered with a particularly high number of indentations, in order to achieve an especially resistant connection between the base 2 and the laminate coating 4 in these areas.

The cleaned base 2 is then coated or puttied with the underlay compound, so that the underlay compound runs into the generated sinkholes and grooves 10 thus ensuring an optimal connection between the base 2 and the laminate covering 4.

This coating of the base 2 with the underlay compound serves to ensure that the underlay compound runs into the indentations rather than the fabric laminate absorbing the underlay compound.

The following resins are suitable for use as the underlay compound: unsaturated polyester resins, epoxy resins, vinyl ester resins and polyurethane resins. These resins can be provided with filler materials such as hollow glass bead, talcum, wood flour, glass fiber chips, cotton flock, aluminum powder, ground carbon fibers, chalk, ground quartz, ground hemp fibers, silicic acids and dyes.

At the start of the actual lamination process, a glass filament fabric, aramid fabric, carbon fabric, fiberglass fabric, hemp fiber fabric, Dyneema, bamboo fabric or veneer, or a composite fabric comprised of the above-listed materials is treated with the underlay compound on a separate table.

The fabric laminate is then placed on the base 2. The ratio of fabric laminate layer thicknesses from the upper to the underneath side can range from 5:5 to 6:4. In this, the laminate coatings on the upper and underneath sides overlap, so that in the area of the connecting edges there is a double laminate coating, in order to ensure a sufficiently stable connection under stress, even at the connecting edges.

Any air bubbles that might become trapped following positioning of the fabric laminate can be forced out using a putty knife.

In a further process step a tear-off fabric is applied, which is not absorbent and thus does not absorb the underlay compound. The tear-off fabric made of nylon having linen or twill weave type has a surface weight of 50 to 120 $g/m^2$. The tearing off of the tear-off fabric roughens the surface of the base 2, so that a subsequent surface coating will adhere better.

Any air bubbles that might become trapped during positioning of the tear-off fabric can also be forced out using a putty knife.

Next a vacuum punched foil is applied, which is used to press laminates.

This is followed by an absorbent web, which is placed over the punched foil and serves to absorb the excess underlay compound that is forced out during the vacuum process. Everything is then placed in a vacuum bag and sealed airtight, so that a pressure of ca. 0.75 bar can act, for example, for eight hours on the laminate. Upon completion of this process, the laminated base 2 is separated from the absorbent web and the punched foil. Then the tear-off fabric is removed. Once the tear-off fabric has been removed, a number of roughness elements 8 remain on the surface, which are designed to be point symmetric and are arranged non-directionally.

The coating is then laminated to the second side of the board-shaped base, in the same art and manner.

To complete production of a surfboard, fin and leash plugs must then be attached.

With this the process for producing a surfboard is completed and the surfboard is finished. The repeated application of an underlay compound and the labor-intensive subsequent sanding are no longer necessary, and as a result of the absence of the last coating the surfboard is ca. 15 to 20% lighter.

With this manufacturing method the production of a negative mold is not necessary; instead, individual forms can be provided with a laminate covering. Thus the method is suitable not only for the production of fiber composites for sporting equipment, such as surfboards, but can also be used advantageously in other fields, such as the production of prostheses, in aeronautics, and in the vehicles industry.

In addition to the described vacuum process, an injection process may also be used, in which the fabric laminate is positioned dry on the base 2 that has been coated with underlay compound. The underlay compound is then suctioned into the fabric laminate via the vacuum, wherein the underlay compound is equipped with transport channels that will ensure an optimized distribution of the underlay compound. With this, the orientation of the fibers of the fabric laminate is maintained due to the low flow rate of the underlay compound, which results in good mechanical properties that can be reproduced.

The following refers by way of example to FIGS. 2 through 4. The surfboard-shaped bases 2 are equipped with three grooves 10 that extend in a longitudinal direction, and have been filled prior to lamination with an underlay compound, for example a resin or a resinous compound. However, other underlay compounds may also be used. On the grooves 10 filled with underlay compound, fabric laminate strips 12 having a width of 15 to 20 cm (see FIG. 2) are laid. However, fabric laminate strips 12 having a greater width (up to 35 cm) may be applied to the base 2 (see FIG. 3), or a fabric laminate layer 14 may be applied over the entire surface. Prior to a subsequent laminate coating, the fabric laminate strips 12 or the fabric laminate layer 14 are pressed into the grooves 10, wherein the sections of the pressed-in fabric laminate strips 12 or the fabric laminate layer 14 become impregnated with the underlay compound, with which the grooves 10 are filled.

As an alternative to this, the fabric laminate strips 12 or the fabric laminate layer 14 can be pressed into the grooves 10 first, followed by a step in which the underlay compound is applied to the base 2 that has been prepared in this manner, and permeates into the grooves 10 with the fabric laminate strips 12 or fabric laminate layer 14 that have been pressed-in in sections. In addition, the fabric laminate strips 12 or the fabric laminate layer 14 can be pressed in using a tool.

With the pressing-in of fabric laminate strips 12 or of a fabric laminate layer 14 in sections, the fiber ratio can be increased to up to 80%, which results in a further increase in strength and stability.

Below, reference is made to FIGS. 5 through 8.

FIGS. 5 through 8 show surface profiles of surfboards as specified in the invention. The maximum roughness depth is shown as a vertical distance between the highest and lowest point on the filtered roughness profile within the sampling length. In this, the surface profile shown in FIG. 5 has a maximum roughness depth of 118.5 μm, while the surface profile shown in FIG. 6 has a maximum roughness depth of 96.64 μm, the surface profile shown in FIG. 7 has a maximum roughness depth of 71.20 μm, and the surface profile shown in FIG. 8 has a maximum roughness depth of 140.8 μm.

The mean roughness value, which is defined as the arithmetic mean of the profile deviation of the (filtered) roughness profile of the center line within the measuring length according to DIN 4786, DIN 4762 and ISO 4287/1, amounts in the surface profile shown in FIG. 5 to 12.62 μm, in the surface profile shown in FIG. 6 to 12.09 μm, in the surface profile shown in FIG. 7 to 11.6 μm and in the surface profile shown in FIG. 8 to 12.88 μm. With these surface profiles a definite improvement in surfing properties could be achieved.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. A device, comprising:
   a) a base made of foamed plastic material;
   b) a laminate coating being provided on the base, the laminate coating including a fabric layer and an underlay compound;
   c) an intermediate layer being provided between the base and the fabric layer;
   d) the intermediate layer including the underlay compound of the laminate coating; and
   e) the base being provided with indentations, and the underlay compound of the laminate coating being in the indentations of the base, and the foamed plastic material including a foamed plastic having an open cell structure.

2. The device according to claim 1, wherein:
   a) the intermediate layer includes material from the fabric layer.

3. The device according to claim 1, wherein:
   a) the indentations are configured as grooves.

4. The device according to claim 3, wherein:
   a) the fabric layer is arranged in the grooves at least in sections.

5. The device according to claim 3, wherein:
   a) the grooves have a depth of up to 6 cm.

6. The device according to claim 3, wherein:
   a) the grooves are arranged in one of a parallel and a criss-cross pattern.

7. The device according to claim 1, wherein:
   a) the indentations are configured as sinkholes.

8. The device according to claim 7, wherein:
   a) the sinkholes are configured as one of conical and cylindrical in shape, have a depth of up to 8 cm, and a diameter of up to 5 mm.

9. The device according to claim 1, wherein:
   a) the indentations are arranged in a regular pattern.

10. The device according to claim 1, wherein:
    a) the indentations are arranged in an irregular pattern.

11. The device according to claim 1, wherein:
    a) the fabric laminate includes at least one of glass fibers, aramid fibers, polyethylene fibers, carbon fibers, glass filament fabric, carbon fabric, fiberglass fabric, hemp fiber fabric, or bamboo fabric.

12. The device according to claim 1, wherein:
    a) the fabric layer includes at least one of glass fibers and or fibers aramid and
    b) a surface weight of the fabric of the glass fibers and aramid is up to 1,000 g/m$^2$.

13. The device according to claim 1, wherein:
    a) the fabric layer includes at least one weave type from the group of linen, twill 1/3, twill 2/2, unidirectional, glass staple fiber fabric, woven glass roving fabric, satin fabric, carbon layers, or polyethylene (PE) fibers.

14. The device according to claim 1, wherein:
    a) the foamed plastic material includes one of polyurethane, polystyrene, polyvinyl chloride (PVC), core cell, or phenolic foam.

15. The device according to claim 1, wherein:
    a) the foamed plastic material further includes a foamed plastic having a closed cell structure.

16. The device according to claim 1, wherein:
    a) the underlay compound includes at least one of an unsaturated polyester resin (UP), an epoxy resin (EP), a vinyl ester resin (VE), or a polyurethane resin (PU).

17. The device according to claim 1, wherein:
    a) filler materials are added to the underlay compound.

18. The device according to claim 17, wherein:
    a) filler materials include one of hollow glass bead, talcum, wood flour, glass fiber chips, cotton flock, aluminum powder, ground carbon fibers, chalk, ground quartz, ground hemp fibers, silicic acids or dyes, and a combination of these.

19. The device according to claim 1, wherein:
    a) roughness elements are provided on the laminated coating, and the roughness elements being provided at least in sections of the laminated coating.

20. The device according to claim 19, wherein:
    a) the roughness elements are configured to be point symmetric and are arranged in a non-directional pattern.

21. The device according to claim 19, wherein:
    a) the maximum roughness depth of the roughness elements is up to 1,000 μm.

22. The device according to claim 19, wherein:
    a) the mean roughness value is between 5 and 100 μm.

23. The device according to claim 19, wherein:
    a) the mean roughness value is between 10 and 15 μm.

* * * * *